United States Patent [19]

Wieser

[11] 3,909,644

[45] Sept. 30, 1975

[54] ELECTRIC MOTOR UNIT FOR OPERATION AT HIGH MOTOR TEMPERATURE

[75] Inventor: Fritz Wieser, Wunsiedel, Germany

[73] Assignee: Klein, Schanzlin and Becker Aktiengesellschaft, Frankenthal, Germany

[22] Filed: Mar. 25, 1974

[21] Appl. No.: 454,293

[30] Foreign Application Priority Data

Mar. 27, 1973 Germany............................ 2315192

[52] U.S. Cl. ...................... 310/71; 339/112; 310/53
[51] Int. Cl.² ........................................ H02K 11/00
[58] Field of Search ............. 310/71, 58, 66, 55, 75, 310/64, 52, 89, 53, 65; 320/2; 417/336–371; 322/28; 339/112; 336/107, 192

[56] References Cited
UNITED STATES PATENTS

| | | |
|---|---|---|
| 2,512,407 | 6/1950 | Wood ................................... 310/75 |
| 2,683,227 | 7/1954 | Beckwith ............................. 310/71 |
| 2,768,267 | 10/1956 | Pass ..................................... 339/112 |
| 3,010,401 | 11/1961 | Granquist ........................... 417/366 |
| 3,033,537 | 5/1962 | Brown ................................. 339/112 |
| 3,495,111 | 2/1970 | Haydon ............................... 310/71 |
| 3,716,733 | 2/1973 | Keith ................................... 310/71 |
| 3,798,504 | 3/1974 | Kreissl ................................. 310/71 |

Primary Examiner—R. Skudy
Attorney, Agent, or Firm—Michael S. Striker

[57] ABSTRACT

An electric motor of the type normally operated at high temperature has a connector housing constructed and arranged to maintain a lower temperature therein. Electric motor windings have end portions which extend from the motor through a duct into the connector housing. They are connected therein to external circuit means preferably by hard-soldered, welded or pinched connections.

4 Claims, 1 Drawing Figure

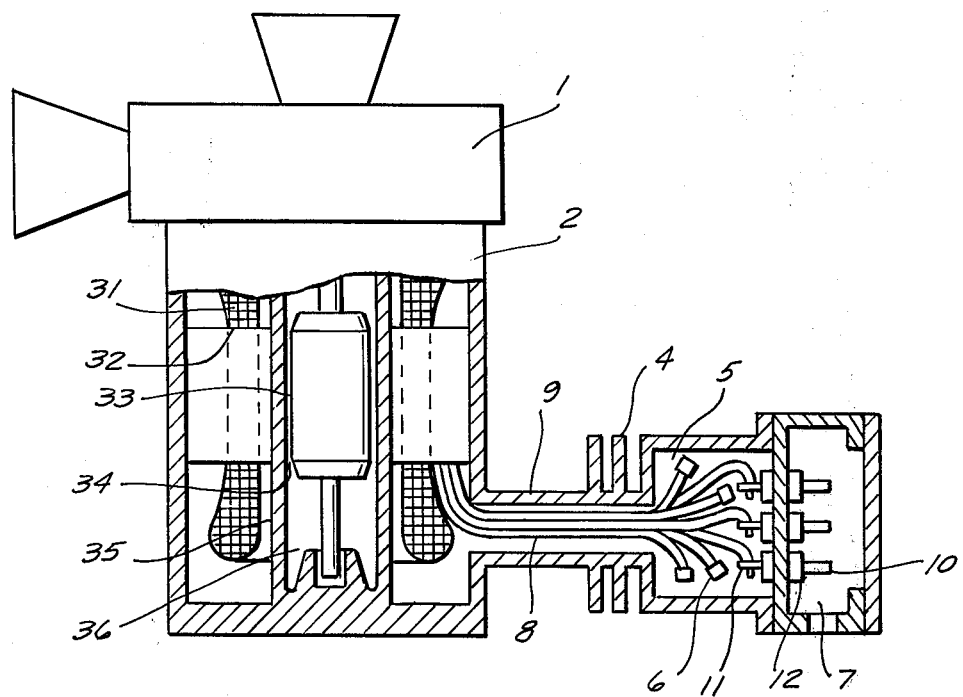

ELECTRIC MOTOR UNIT FOR OPERATION AT HIGH MOTOR TEMPERATURE

BACKGROUND OF THE INVENTION

The invention relates to electric motors normally operpated at high temperature, above the normal ambient or room temperature, particularly motors of the type known as gap tube motors, wherein the rotor is immersed in hot liquid, circulated by a pump which is driven by the rotor. In typical constructions of this type the difficulty was encountered that the insulators of the motor coils did not withstand the high temperatures. This problem has been solved by the use of purely inorganic insulating materials. The further difficulty was then encountered that the connections between the ends of the coils and the conductors leading to the source of current were endangered by processes of oxidation, such processes being particularly strong and particularly rapid at high temperature. In order to avoid resulting corrosion of the connecting means it was necessary to use special protective, corrosion resisting layers, such as a coating of nickel, However, all of the usual connecting means, including hard-soldered, welded and pinch type connectors, are subject to impairment of the protective layer at the connecting point, mainly by the heat of soldering or welding or by the distortion involved in pinch-connecting. Even if such points are subsequently re-coated, at considerable cost, the protective layer cannot be restituted to the quality of a proper unimpaired layer, at the point where the layer has once been impaired. Therefore, early corrosion is to be expected at such points.

SUMMARY OF THE INVENTION

Is is an object of the invention to overcome the problems and difficulties mentioned above.

It is a further object of the invention to provide electric motors of the indicated type with connecting means safely protected against corrosions.

It is a further object to provide simple and economical connecting means for motors operated at a high temperature.

The invention achieves the object by leading coil end portions from the hot motor housing into a housing maintained at lower temperature, and by connecting said end portions with external circuit means in the housing maintained at lower temperature.

Temperatures up to 450°C are typically encountered in the stator housings of pump motors of the indicated type. Far lower temperatures, generally in the range of normal room or ambient temperatures, can be maintained at the connection points, by the use of a separate connector housing in accordance with the invention, thereby greatly reducing the danger of corrosion. Thus, it becomes unnecessary to provide special protective layers, or to repair the same after the operation of connecting the coil ends with the external circuit means. It becomes possible to use any desired type of connecting means, such as hard soldering, welding, or pinching, without difficulties of the aforementioned kind. The separate connector housing, maintained at low temperature, can be provided in or as part of a terminal box for the motor, thereby also protecting the terminals and the conductors connected therewith from high temperatures.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE Of the drawing is a side view, largely in central vertical section, of a preferred embodiment of the invention.

DESCRIPTION OF THE PREFERRED EMBODIMENT

As shown in the FIGURE, pump 1 is driven by gap tube motor 2. The pump circulates a heat carrier liquid, for example to a refrigerator (not shown), where the liquid is evaporated, caused to absorb heat, again liquefied, and returned to the pump in well-known manner, the returned liquid carrying heat, absorbed in the refrigerator, into the pump. Since a liquid of this type must be sealed from contact with lubricating oil or with cooling water or air, the liquid itself is used as a lubricant and coolant and is for this purpose received in a sealed chamber 36 defined by a gap tube 35 around gap 34 and central rotor 33, the rotor being rotated as stator 32 is energized by stator coils 31, disposed around the gap tube 35. The liquid, which usually arrives hot in gap tube chamber 36, is additionally heated as it cools the motor and lubricates the rotor bearings therein. While the liquid itself is kept out of contact with the stator 31, 32, heat of the liquid flows into and through these parts, often heating the stator coils 31 to a temperature close to the above mentioned typical motor temperature of 450°C. At such a temperature, conventional hard solder joints, weld joints and the like connecting the stator coils to each other and to a source of current, are subject to rapid corrosion and failure, as explained above.

According to the invention, the housing 3 of motor 2 is connected, across a heat barrier 4, with a separpate connector housing 5 spaced from the motor 2. This separate connector housing 5 is not in contact with any hot medium such as the circulating liquid in gap tube chamber 36, and can be maintained at substantially lower temperature than the temperature which prevails in the motor housing 3 at normal operation of the motor.

For connecting the motor housing 3 with the separate connector housing, a duct 9 is provided, which has opposite ends joined to these housings, and through which end portions 8 of coils 31 extend from stator 31, 32 to connectors 6, 11. Heat barrier 4 advantageously comprises fins extending radially from duct 9, at a location spaced from motor 2, for radiatively and/or convectively dissipating heat, brought from the hot motor 2 into duct 9 by coil ends 8, into the atmosphere.

By these arrangements the end portions 8 of hot coil connector windings 31, disposed in the cool housing 5, can be successfully connected at 6 to each other, 11 to their source conductors, and at without danger of corrosion at high temperatures, by ordinary hard solder, weld or pinch connections. For this purpose terminals 10 adapted to be connected to external circuitry, not shown in the drawing are fastened to a transverse end wall of the separate connector housing 5, at 12, and extend from a housing or terminal box 7 for terminal block 10, through wall and fasteners 12, into connector housing 5.

It will be understood that each of the elements described above, or two or more together, may also find a useful application in other types of electric motor units differing from the types described above.

While the invention has been illustrated and described as embodied in an electric motor unit, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. In an electric motor unit, a combination comprising a motor housing which is at high temperatures during operation thereof; electric motor windings mounted in said housing; a separate connector housing spaced from said motor housing and constructed and arranged to maintain substantially lower temperatures therein, said windings having end portions extending into said connector housing; a terminal box having an end wall in common with said separate connector housing; and terminals extending through said end wall for connecting end portions of said motor windings to external circuit means.

2. The combination defined in claim 1, also including a pump driven by said motor unit for pumping hot liquid, said unit including, in said motor housing: a central rotor; a tubular housing surrounding said rotor and normally filled with hot pumped liquid; and a stator around said tubular housing, said windings being part of said stator.

3. In an electric motor unit, the combination of a motor housing which is at high temperature during operation of the motor unit; electric motor windings in said housing; a separate connector housing spaced from said motor housing and constructed and arranged to maintain a substantially lower temperature therein than the high temperature of said motor housing, said winding having end portions extending into said connector housing for connecting them to each other and to external circuit means; duct means between said motor housing and said connector housing, said end portions of said motor windings extending through said duct means; and heat barrier means forming part of said duct means.

4. The combination defined in claim 3 wherein said heat barrier means is spaced from said motor housing and comprises means for transferring heat from said duct means to the atmosphere.

* * * * *